Patented Oct. 17, 1950

2,526,517

UNITED STATES PATENT OFFICE 2,526,517

N-METHYLOL MALEIMIDE

Pliny O. Tawney, Passaic, N. J., assignor to United States Rubber Company, New York, N. Y., a corporation of New Jersey No Drawing. Application March 3, 1948, Serial No. 12,891

1 Claim. (Cl. 260—313)

This invention relates to a new chemical, denoted N-methylol maleimide.

From the method of preparation, this compound is considered to have the formula

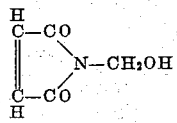

It is prepared by the condensation of formaldehyde with maleimide.

Although formaldehyde is known to undergo a variety of reactions with compounds containing an ethylenic linkage, in its reaction with maleimide, formaldehyde condenses with the imido-nitrogen atom, leaving the olefinic linkage unchanged. The resulting N-methylol-maleimide can be employed as an intermediate in the synthesis of pharmaceuticals, dyes, plasticizers, etc.

More particularly, my new compound is prepared by reacting maleimide with one or more, particularly 1-2 molar equivalents, of formaldehyde, preferably under neutral or slightly alkaline conditions, e. g., pH of 7-8, at 25-115° C. and for reaction times in the range of 0.1-5.0 hours. Any of the available forms of formaldehyde can be employed in this reaction, and the use of the concentrated (ca. 37%) aqueous solution of formaldehyde has proven particularly convenient.

The reaction product can be isolated by evaporation of the reaction mixture and extraction of the residue with a solvent such as an ether. Purification can then be effected by recrystallization.

The following example discloses my invention in more detail. All parts are by weight.

Example

Fourteen parts of maleimide are added to approximately 27 parts of an essentially neutral 37% aqueous solution of formaldehyde containing a trace of potassium carbonate. The mixture is refluxed for 0.5 hour. The reaction mixture is then evaporated to remove water and any unreacted formaldehyde and the residue is extracted with several volumes of diethyl ether. The extract is dried, the solvent is evaporated and the solid product is recrystallized from benzene to yield 11 parts of N-methylol maleimide (m. 103.5–104.5° C.) containing by analysis 11.00% nitrogen (theory, 11.02%).

Having thus described my invention, what I claim and desire to protect by Letters Patent is:

N-methylol maleimide.

PLINY O. TAWNEY.

REFERENCES CITED

The following references are of record in the file of this patent:

UNITED STATES PATENTS

| Number | Name | Date |
|---|---|---|
| 2,205,558 | Flett | June 25, 1940 |

FOREIGN PATENTS

| Number | Country | Date |
|---|---|---|
| 119,712 | Australia | Mar. 29, 1945 |

OTHER REFERENCES

Taggart: Jour. Amer. Chem. Soc., vol. 56 (1934) pp. 1385–1386.